United States Patent
Rohr

[11] Patent Number: 6,146,059
[45] Date of Patent: Nov. 14, 2000

[54] END MILLING CUTTER

[75] Inventor: Olaf Rohr, Schwarzenbek, Germany

[73] Assignee: Wilhelm Fette GmbH, Schwarzenbek, Germany

[21] Appl. No.: 09/080,706

[22] Filed: May 18, 1998

[30] Foreign Application Priority Data

May 26, 1997 [DE] Germany .................... 197 21 900

[51] Int. Cl.[7] .................................................. B23C 5/20
[52] U.S. Cl. .............................. 407/40; 407/42; 407/54; 407/65
[58] Field of Search .................. 407/34, 35, 47, 407/49, 50, 53, 62, 64, 113, 65, 54, 40, 42

[56] References Cited

U.S. PATENT DOCUMENTS

| | | | |
|---|---|---|---|
| 1,071,479 | 8/1913 | Strudwick | 407/35 |
| 1,822,176 | 9/1931 | Sproul | 407/35 |
| 4,286,901 | 9/1981 | Eckle | 407/47 X |
| 4,349,057 | 9/1982 | Bachman et al. | 407/47 |
| 4,487,532 | 12/1984 | Hamilton | 407/49 |
| 4,493,594 | 1/1985 | Okada | 407/49 |
| 4,525,110 | 6/1985 | Stojanovski | 407/54 X |
| 5,211,516 | 5/1993 | Kress et al. | 407/49 |
| 5,632,576 | 5/1997 | Storch | 407/54 X |
| 5,863,157 | 1/1999 | Harano et al. | 407/48 X |
| 5,904,448 | 5/1999 | Lee et al. | 407/49 X |
| 5,951,213 | 9/1999 | Fauser et al. | 407/65 X |

FOREIGN PATENT DOCUMENTS 41 27 509  9/1993  Germany .

Primary Examiner—Henry W. H. Tsai
Attorney, Agent, or Firm—Vidas, Arrett & Steinkraus, P.A.

[57] ABSTRACT

An end milling cutter with which two cutting plates can be fastened on the shank displaced in the circumferential direction with the help of fastening means, wherein there is provided a clamping plate which by way of a single clamping screw can be pressed with one end against the shank and with the other end against both cutting plates, wherein one clamping section of the clamping plate bears against the front side of one clamping plate and another clamping section against the rear side of the other clamping plate and wherein the clamping section of the clamping plate which bears against the rear side of the other cutting plate is formed as a seat for this cutting plate.

7 Claims, 1 Drawing Sheet

END MILLING CUTTER

BACKGROUND OF THE INVENTION

The invention relates to an end milling cutter according to the introductory part of patent claim 1.

Milling cutters of the known type have become known in various embodiment forms. They are for example used in the manufacture of casting moulds. Many times, with regard to this, end milling cutters are used with which at least one cutting plate having mostly a circular contour is attached to the free end. It has also become known to arrange two or more cutting plates at a circumferential distance.

Such cutting plates are mostly fastened to the shank with the help of tensioning screws. The shank comprises a plate seat with a threaded bore, and the cutting plates are provided with a through-bore for guiding through a tensioning screw. Such a fixation of the cutting plates is satisfactory per se, but however does encounter some problems when the dimensions of the cutting plates fall below a lower measure. The diameter of the through-bore by nature gets smaller with cutting plates which become smaller. Accordingly the dimensions of the tensioning screw also are reduced. Since the tensioning screws mostly comprise a polygon socket on the head, on reaching these dimensions an over twisting may easily occur. It is therefore difficult to release the cutting plate or to satisfactorily fasten then without damaging the screw.

BRIEF SUMMARY OF THE INVENTION

It is therefore the object of the invention to provide an end milling cutter for two cutting plates which are effectively releasably fastenable without there arising any difficulties in handling.

This object is achieved by the feature of claim 1.

With the invention there is provided a clamping plate which may be tensioned by way of a single clamping screw.

The clamping plate is supported with one end on the shank and comprises on the other end two clamping sections of which one is engagement with the front side of one cutting plate and the other is in engagement with the rear side of the other cutting plate. The clamping section of the clamping plate which bears against the rear side of the other clamping plate is formed as a seat for this cutting plate.

The single clamping screw is located outside the contour of the cutting plates and may therefore be provided with a suitable diameter. It is therefore possible with the help of clamping plates to effectively fasten both cutting plates. The clamping screw which is to be dimensioned sufficiently large may therefore be also effectively grasped by a tool and be released or tightened.

The fastening, according to the invention, of the cutting plates is not dependent on whether these are diametrically arranged. However to be preferred is an arrangement of the cutting plates mostly parallel to one another, so that the clamping plate may become engaged in two parallel planes with the facing cutting plate in each case.

It is known to provide swarf troughs for the removal of swarf. With the end milling cutter according to the invention one swarf trough is located in the shank, for example on its end face, whilst another swarf trough is formed in the clamping section of the clamping plate which cooperates with the front side of the cutting plate.

The tensioning screw preferably has a conical head which cooperates with a conical bore section of the clamping plate. The head of the clamping screw preferably has an polygon socket, preferably a hexagon socket in order to be actuated by a tool. Preferably the shank comprises a threaded bore with which the tensioning screw cooperates. For reasons of fastening, the threaded bore may comprise an offset to the fitting bore in the clamping plate of e.g. 2 mm. Via the conical head of the screw the clamping plate is pressed against the one end of the shank.

In order to obtain an improved securement between the clamping plate and the cutting plates it may be envisaged to form the latter with a trough.

In order to obtain a position orientation of the clamping plate on the shank this clamping plate has an elongate projection transverse to the longitudinal extension of the plate which cooperates with a corresponding recess of the shank.

BRIEF DESCRIPTION OF THE DRAWINGS

The invention is hereinafter described in more detail by way of the drawings.

DETAILED DESCRIPTION OF THE INVENTION

Figure 1:
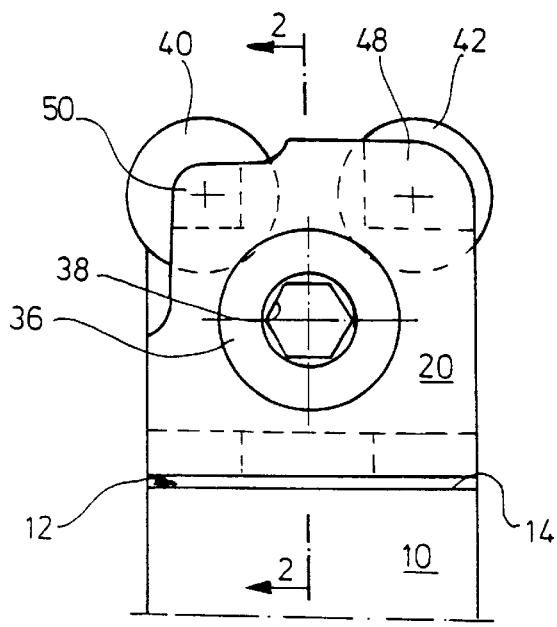
FIG. 1 shows a lateral view of an end milling cutter according to the invention.
Figure 2:
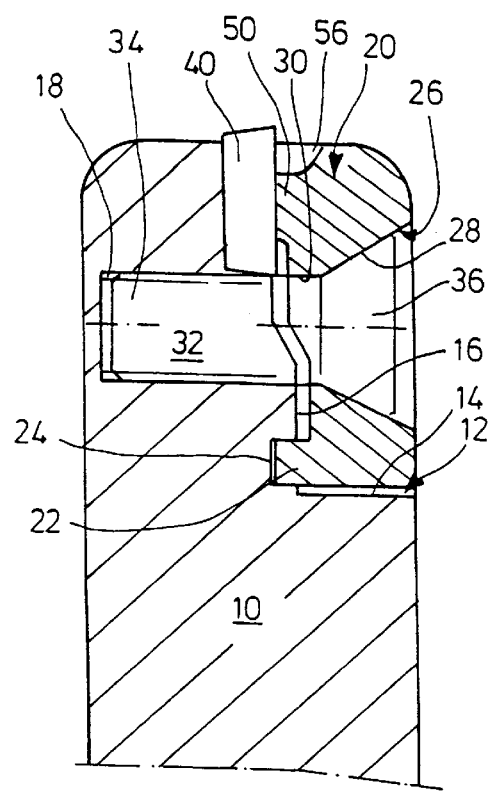
FIG. 2 shows a section through the representation according to FIG. 1, along the line 2—2.

Before the description of the drawings is dealt with it is to be mentioned that the section representation in FIG. 2 is rotated relative to FIG. 1 about 180°.

In the figures there is represented a shank 10 with a circular cross section, of an end milling cutter which at the free end comprises a recess 12. The recess has a first surface 14 transverse to the longitudinal axis of the shank 10 and a second surface 16 which runs essentially parallel to the longitudinal axis. Into the surface 16 there is formed a threaded bore 18 whose axis is perpendicular on the longitudinal axis of the shank.

By way of the recess 12 a clamping plate 20 is accommodated, whose outer contour is formed such that it complements the contour of the shank 10 in the region of the recess, i.e. on the outer side is essentially circular arc shaped and is rounded upwards towards the free end of the shank, as can be particularly deduced from FIG. 2.

In the lower region in the FIGS. 1 and 2 the clamping plate 20 comprises a transversely extending ledge 22 which is seated with a slight play in a correspondingly formed recess 24 in the surface 16. By way of this the clamping plate is held in its position in an orientated manner. In this position a through-bore 26 of the clamping plate 20 is aligned to the threaded bore or there is provided a small offset in order to produce a pretensions for the clamping plate. The through-bore 26 comprises a conical section 28 and a cylindrical section 30. The through-bore 26 accommodates a clamping screw 32 whose shank 34 is seated in the threaded bore 18 and whose conical head 36 cooperates with the conical bore section 28. As can be deduced from FIG. 1 the head 36 comprises a hexagon socket.

Between the clamping plate 20 and the corresponding section of the shank 10 there are diametrically arranged two circular cutting plates 40. The design and arrangement of the cutting plates 40, 42 is conventional. However it is essential in the present case that in the shank 10 there is only formed one seat 44 for the cutting plate 40 whilst a seat 46 is formed in the clamping plate 20. The clamping plate 20 bears with clamping sections 48, 50 on the cutting plates 40, 42, in order to press these against the counter sections of the shank 10 in the region of the surface 16. Accordingly a swarf trough 54 is located at the free end of the shank 10 and a swarf trough 56 at the free end of the clamping plate 20. The swarf troughs 54, 56 are in each case open to the outside which can be deduced from the figures.

Figure 3:
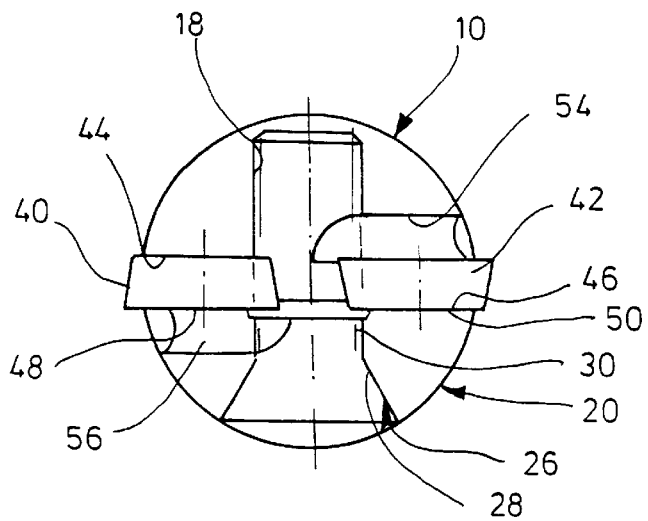
FIG. 3 shows a plan view of the end milling cutter according to FIG. 1.

As can be recognized with the help of the clamping plate 20 the cutting plate 40 is grasped from the front side and the cutting plate 42 from the rear side, in order to press and hold them against the corresponding sections of the surface 16. As can be deduced by viewing together the FIGS. 1 and 3 the swarf trough 54, 56 also extend downwards parallel to the axis in order to improve the removal of swarf.

As can further be recognized, the clamping plate 20 is clampingly pressed against the cutting plates 40, 42 with the help of a single tensioning screw. The tensioning screw 32 is located outside the outer contour of the cutting plates 40, 42 and may therefore be provided with a sufficient diameter or the head may be chosen sufficiently large in order to obtain a suitably dimensioned polygon socket for an effective engagement of a tool. A further advantage lies in the fact that for releasing or fastening two clamping plates only a single screw is required which reduces the time effort.

What is claimed is:

1. An end milling cutter comprising:
   a shank having a recess at one end, the recess having a bottom wall provided with a tapped hole;
   a clamping plate received by said recess, the clamping plate having an inner end, an outer end and a hole, the outer end being provided with a first clamping section and a second clamping section, the inner end constructed and arranged to engage said bottom wall;
   a single clamping screw constructed and arranged to extend through the hole in the clamping plate and to threadingly engage the tapped hole;
   a first cutting insert and a second cutting insert, each cutting insert having a top portion, a bottom portion and a cutting edge associated with the top portion;
   the recess having a first seat to receive the bottom portion of the first cutting insert, the top portion of the first insert facing the first clamping section;
   the second clamping section having a second seat to receive the bottom portion of the second cutting insert, the top portion of the second insert facing the bottom wall;
   a first swarf trough formed in the first clamping section and a second swarf trough formed in a portion of the shank associated with the second clamping section.

2. I claim an end milling cutter according to claim 1, wherein the first and second cutting inserts are arranged on a diameter of the shank or on an axis parallel to a diameter.

3. I claim an end milling cutter according to claim 1, wherein the clamping plate in the region of the clamping sections bearing on a front side of the first cutting insert and a front side of the second cutting insert comprises the first swarf trough and the second swarf trough respectively.

4. I claim an end milling cutter according claim 1, wherein the clamping screw comprises a conical head which cooperates with a corresponding conical bore section of the clamping plate.

5. I claim an end milling cutter according to one of the claim 1, wherein the head of the clamping screw comprises a polygon socket for a tensioning tool.

6. I claim an end milling cutter according claim 1, wherein the clamping sections of the clamping plate cooperate with the swarf trough associated with the respective clamping sections.

7. I claim an end milling cutter according to claim 1, wherein the tapped hole is a threaded bore, the clamping screw cooperating with the threaded bore in the shank.

* * * * *